April 7, 1953      A. A. POLLIA      2,634,140

FITTING FOR CONNECTING PIPES

Filed May 25, 1951

INVENTOR.
A.A.Pollia
BY
Edward C. Healy
ATTORNEY

Patented Apr. 7, 1953

2,634,140

UNITED STATES PATENT OFFICE 2,634,140

FITTING FOR CONNECTING PIPES

Andrew A. Pollia, San Francisco, Calif.

Application May 25, 1951, Serial No. 228,261

3 Claims. (Cl. 285—192)

This invention relates to improvements in a coupling for connecting and rigidly securing two oppositely disposed aligned pipe sections, one to the other, without the necessity of threading or welding either of the pipe sections or the coupling. The invention is particularly adaptable for use in connecting pipes made of thin metal, such as sheet metal, the said metal being readily bendable to facilitate the forming of the internal locking construction.

Another object of the present invention is the provision of a specially constructed means for packing the joint formed by the said oppositely disposed pipe sections.

A further object of the present invention is the provision of a transversely slotted sleeve within the two oppositely disposed pipe sections and to position the sleeve across the pipe joint and to bend a portion of the extremities of the two pipes inwardly at the joint, which inwardly bent portions are capable of fitting in the said transversely slotted sleeve, whereby the said two pipe sections and sleeve are rigidly secured one to the other.

A further object of the present invention is to provide a pair of internal arcuate-shaped projections on an external clamp, which projections are adapted to extend between portions of the inner extremities of the pipes and provide a further means of locking the clamp to the pipes in addition to the inwardly and downwardly bent portions that enter the slotted sleeve.

A still further object of the present invention is the provision of a specially constructed device, capable of securing two oppositely disposed aligned pipe sections one to the other, which device is durable, simple in construction, economical to manufacture and highly efficient and serviceable in use.

Other objects and advantages will be apparent during the course of the following description.

In the accompanying drawing, forming a part of the specification, wherein for the purpose of illustration like numerals designate like parts throughout the same, Fig. 1 is a longitudinal view, shown partially in elevation and partially in section, of two oppositely disposed aligned pipe sections and the improved specially constructed coupling provided for rigidly securing the pipes one to the other.

Figure 1:
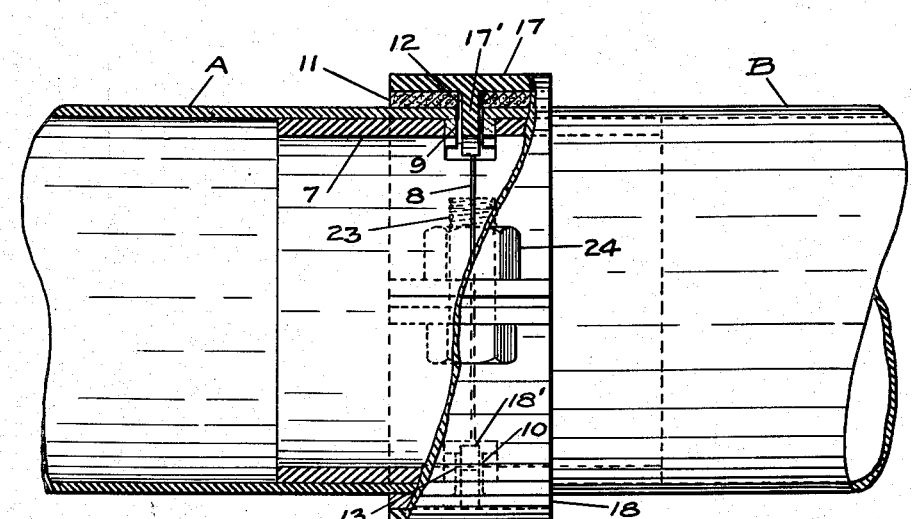
Figure 2:
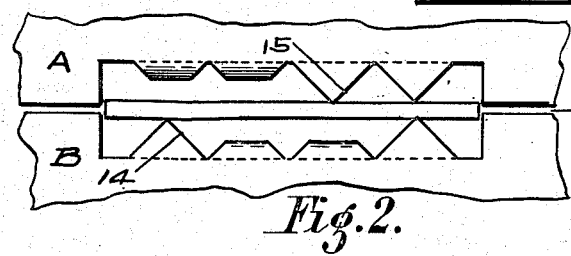
Fig. 2 is a fragmentary top plan view of two aligned sections of pipe positioned in proximity one to the other, and disclosing to advantage how portions of the opposed extremities of the pipes are serrated to facilitate the inward bending of the same.

Referring in detail to the drawing and numerals thereof, the reference character A designates one section of the pipe and the reference character B a pipe section positioned adjacent to and in alignment with the section A, as disclosed to advantage in Fig. 1. An internal locking sleeve 7 is mounted within the said pipes and positioned across the joint 8, thus forming a reinforcing and locking medium within the pipes at the joint. Two opposite sides of the sleeve are formed with transverse slots 9 and 10, which slots are adapted to circumferentially align with the said joint 8. It is obvious that any suitable number of the said slots can be provided in the sleeve. A packing ring 11, made of any suitable flexible packing material, is mounted on the pipes and positioned over the joint for sealing the same. The said packing is preferably constructed from a strip of material of a suitable length to form the ring. It will be noted that the packing ring is also slotted as at 12 and 13, the said slots coinciding with the slots 9 and 10 formed in the sleeve 7. The inner extremities of the pipes A and B are serrated, forming projections 14 and 15, respectively, as shown in Fig. 2. The said projections are preferably formed pointed and are capable of being bent inwardly and extend into the said slots formed in the sleeve, whereby the oppositely disposed pipes are interlocked and rigidly secured one to the other.

Figure 4:
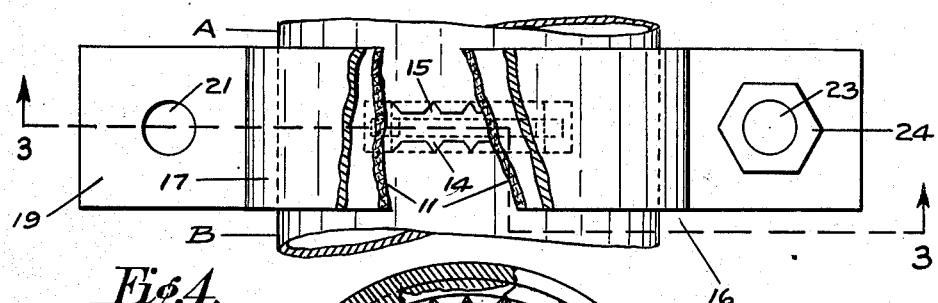
Fig. 4 is a top assembly plan view of the coupling shown positioned over two sections of pipe, a portion of the coupling being broken away to illustrate the packing and inner opposed extremities of the pipe.
Figure 3:
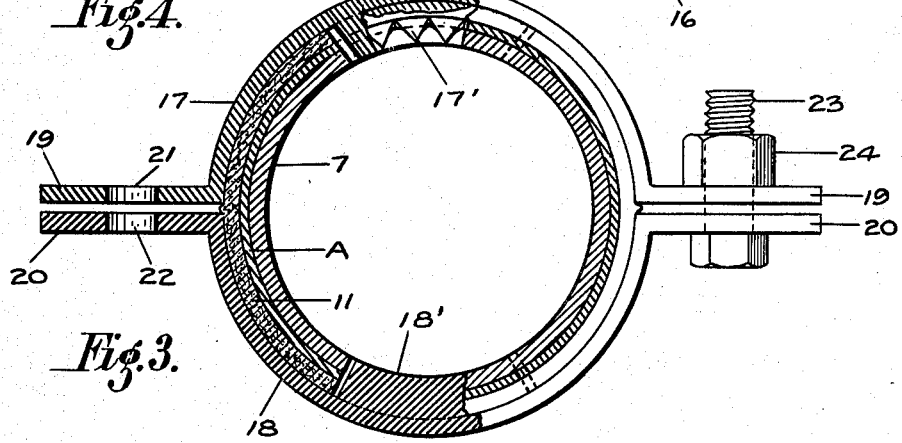
Fig. 3 is a vertical end view, shown partially in section and partially in elevation, the sectional portion being taken on line 3—3 of Fig. 4.

A specially constructed clamp designated as a whole by the numeral 16 and formed of two semi-circular rings 17 and 18 is provided for tightening the packing over the joint and also for rigidly securing the pipes A and B one to the other. Oppositely disposed flanges 19 are formed on the clamping member 17, and likewise, oppositely disposed flanges 20 are formed on the clamping member 18 as disclosed to advantage in Fig. 3.

The said semi-circular sleeves 17 and 18 forming the clamp 16 are provided with inner extending arcuate-shaped projections 17 and 18, which projections are adapted to extend between the inner extremities of the pipes A and B, enter the slots therein, and provide an additional means for longitudinally locking the pipe sections, thereby strengthening the assembly.

Each of the said flanges are apertured as at 21 and 22, and suitable bolts 23, provided with nuts 24, are employed for tightening the semi-circular clamping members against the packing ring 11, and pipe sections A and B, whereby the pipe joint 8 is sealed and the said pipe sections are rigidly secured one to the other.

From the foregoing description, taken in consideration with the accompanying drawing, it is obvious the two pipe sections A and B are rigidly secured one to the other by the slotted inner sleeve 7 and the two semi-circular clamping members 17 and 18, and the joint 8, between the extremities of the two pipes positively sealed by the clamped packing ring 11.

It might be mentioned that in the use of a coupling for heavy pipe, the internal sleeve can be eliminated and an enlarged clamping member can be positioned over the meeting ends of the pipe. Slots are provided to receive a plurality of projections carried by either the clamp or pipe sections, and suitable packing is employed to make the coupling water-tight.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:

1. A device for connecting two pipe sections one to the other and embodying in its construction a sleeve internally positioned across the joint between the two pipe sections, the said sleeve having recesses therein, a plurality of downwardly bent portions provided on said sections at their inner ends and adapted to enter the recesses in said sleeve, a perforated packing member surrounding the joint, an external clamp equipped with internal spaced projections for entering the sleeve recesses and the perforations in the packing member, and fastening elements for detachably securing said clamp over said packing member.

2. A device for longitudinally aligning two pipe sections in close proximity one with the other, comprising an apertured sleeve provided within the pipe sections, portions of the inner extremities of the pipe sections being bent downwardly to define spaced openings in the inner extremities of said sections, the bent portions being receivable in the sleeve apertures, a perforated packing member surrounding the pipe joint, an external clamp equipped with internal spaced projections adapted to penetrate the perforations of the packing member and to enter the sleeve apertures, and fastening means provided on said clamp for compressing the packing member and for securing said clamp about the pipe joint.

3. A device for connecting two pipe sections one to the other and embodying in its construction a sleeve mounted within the pipe sections and positioned across the joint between the sections, the said sleeves having a plurality of slots therein, a plurality of bendable portions provided on the inner end portions of the pipe sections and adapted to fit into the slots of said sleeve, a ring of packing surrounding the joint between the pipe sections and having spaced openings therein, a clamp comprising two semi-circular members positioned over said packing ring, an arcuate-shaped projection depending from each of said members and adapted to penetrate the openings of the packing ring and being receivable in the slots in said sleeve, each of the semi-circular members that form the clamp having horizontal flanges, and fastening means connected to the flanges and adapted to compress the packing ring and tighten the said clamp over the pipe joint.

ANDREW A. POLLIA.

REFERENCES CITED

The following references are of record in the file of this patent:

UNITED STATES PATENTS

| Number | Name | Date |
|---|---|---|
| 2,165,920 | Burnip | July 11, 1939 |
| 2,541,208 | Cornelius | Feb. 13, 1951 |